July 31, 1951  S. A. GOUDSMIT  2,562,664
HYPERBOLIC POSITION-PLOTTING INSTRUMENT
Filed Oct. 30, 1943
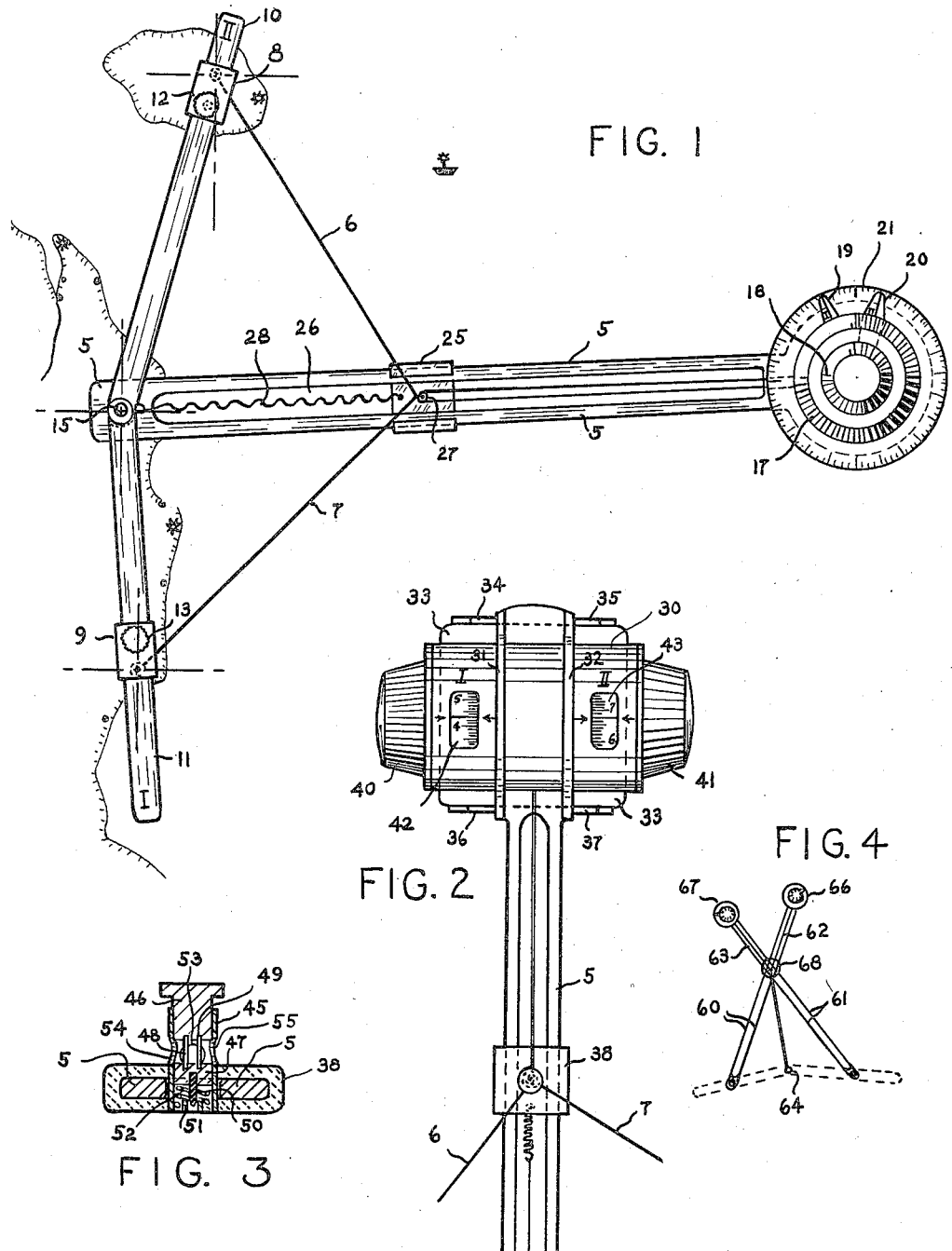
INVENTOR.
Samuel A. Goudsmit
BY
ATTY.

Patented July 31, 1951

2,562,664

UNITED STATES PATENT OFFICE 2,562,664

HYPERBOLIC POSITION-PLOTTING INSTRUMENT

Samuel A. Goudsmit, Cambridge, Mass., assignor, by mesne assignments, to the United States of America as represented by the Secretary of the Navy Application October 30, 1943, Serial No. 508,337

10 Claims. (Cl. 33—189)

This invention relates to a position-plotting instrument adapted to indicate the intersection of two hyperbolae having one common focus. More particularly the invention relates to plotting instruments adapted to determine position in connection with a radio system giving information determinative of the time difference in the arrival of synchronized signals from three different radio stations located at three different places. The term "synchronized" just used is intended to apply to recurrent signals transmitted in a fixed predetermined time relation.

If the relative time of transmission of signals from two stations of known location is known and the difference in the time of reception of the two signals is measured, these data determine a hyperbola (assuming a plane earth) passing through the receiver and having the location of the stations as foci. If similar information is known about signals transmitted respectively from one of the aforesaid stations and a third station, another hyperbola is determined, and the intersection of these hyperbolae determines the location of the receiver. One convenient method of constructing hyperbolae was described by Van Schooten in his "Exercitationes Mathematicarum." Another method of constructing hyperbolae, somewhat less convenient for this purpose, was disclosed by Ziethen in U. S. Patent No. 639,488 of 1899.

It is an object of this invention to provide a convenient and relatively compact apparatus for plotting the position determined by the intersection of the hyperbolae in substantially a single operation without the requirement of drawing the intersecting hyperbolic arcs. It is a further object of this invention to provide a plotting instrument adapted to utilize promptly and effectively the data obtained from the measurement of the difference in the time of arrival of synchronized signals from different radio stations.

Certain illustrative forms of plotting instruments according to this invention are shown in the drawings, in which:

Fig. 1 is a plan view of one form of plotting instrument, shown in use on a chart;

Fig. 2 is a plan view of a portion of a slightly different form of plotting instrument according to this invention;

Fig. 3 is a lateral cross-section of the locating slider of the plotting instrument shown in Fig. 2, and Fig. 4 is a diagrammatic plan view of a modified form of plotting instrument.

It is well known that if a straight edge is pivoted at one point and a string slightly longer than the straight edge is fixed at another point at one end and at its other end to the outer end of the straight edge, a hyperbola can be described by swinging the straight edge until the string is tight and then progressively causing more and more of the outer end of the string to lie along the straight edge, swinging the straight edge just enough to keep the string tight. The curve formed by the points at which the string leaves the straight edge will be the locus of points from which the distances to two fixed points have a constant difference, therefore a hyperbola. This principle is utilized in the plotting instruments of this invention in order to provide an instrument adapted to locate the intersection of two hyperbolae without requiring either of the hyperbolae to be drawn.

The apparatus shown in Fig. 1 is provided with a swinging rod 5 and two strings 6 and 7. The strings 6 and 7 may be of any suitable strand material, preferably a material which stretches very little or practically not at all under normal variation of temperature, humidity and tension. The type of material used in drafting instruments, as with certain types of drawing boards, is suitable in this respect. As shown in Fig. 1, the strings 6 and 7 are fixed at one end on the sliders 8 and 9, respectively, these sliders adjustably mounted on the rods 10 and 11 respectively. The position of the sliders 8 and 9 with respect to the rods 10 and 11 may be fixed by means of the respective set screws 12 and 13.

The rods 10 and 11 have a common pivoted joint 15 with the swinging rod 5. Means are provided for locating the center of the pivoted joint 15, and the points at which the strings 6 and 7 are respectively fastened to the sliders 8 and 9 directly over the three respective base points on a chart on which it is desired to plot a position. Such means might include suitably located sharp points, or small pins adapted to project into appropriate holes or bearings provided in the chart, or some other form of means adapted to fix the position of the points. One rather unusual way of fixing the position of these points suggested by my colleague L. E. Rovner, is to provide small permanent magnet structures having relatively high magnetization and to provide a ferromagnetic material directly under the chart so that the small permanent magnets are held fixed on the chart after being suitably located by hand.

The other end of the strings 6 and 7 are wound up on reels (not shown) mounted on the end of the swinging rod 5 which is farthest from the pivot 15, these reels being controlled by suitable knobs, such as the knobs 17 and 18 respectively, which cooperate with the pointers 19 and 20 and the scale 21 to indicate the length of the respective strings paid out by the reels. The reels need not be large in the axial dimension, and may, for convenience, be mounted coaxially. If desired, gearing may be provided between the knobs and the respective reels in order that a single revolution of a knob may correspond to several revolutions of one of the reels, thus permitting a smaller reel diameter. If desired, the gearing might be introduced only between the pointer and the reels, so that the knobs might be capable of more accurate adjustment. In the case last mentioned, an auxiliary scale might be provided for a vernier reading. Suitable guides may be provided near the reels so that the angular position of the strings between the slider 25 and the reels will not vary substantially when the slider 25 is moved.

The swinging arm 5 is provided with a central slit 26 which extends for the greater part of the length of the arm 5 in order that the locator post 27 mounted on the slider 25, which is in turn mounted on the arm 5, may for all positions of the slider 25 be located on a straight line between the center of the pivot 15 and the intake of the reels. The locator post 27 is a vertical pin over which the strings 6 and 7 are run. The pin should be of small diameter in order that the points of inflection of the strings 6 and 7 will be only a negligible amount displaced from the straight line between the center of the pivot 15 and the intake of the reels. This pin may be a solid structure adapted to make a mark upon the chart when suitably depressed or it may be a very narrow tube through which a pricking or marking instrument may be passed when it is desired to mark on the chart a position which has been plotted or determined. In order that the strings 6 and 7 may be kept tight, a spring 28 is connected between the slider 25 and a fixed point on the arm 5 near the pivot 15.

If desired, the reels may be mounted on the sliders 8 and 9 instead of on the arm 5 with the fixed ends of the strings then being fastened to the end of the arm 5. The form of construction shown in the drawing, is, however, preferred because it allows the arms 10 and 11 to be folded over the arm 5 when the device is not in use, making the device capable of being stored in a relatively small space. Instead of the simple spring 28, there may be provided means for drawing the slider 25 towards the pivot 15 including such mechanical arrangement as a small crank or handwheel. In such case the slider 25 may be drawn to the left by a suitable strand and, preferably, a small spring, which may be relatively stiff, should be inserted between such strand and the slider 25 in order to provide a certain amount of flexibility and to indicate when a suitable tension has been applied. With such an arrangement, the plotting instruments can readily be used at a standard tension.

The tension applied to the strings will vary with the angle of inflection at the slider, but for greater inflections the reduced tension will be at least in part compensated by the greater amount of string freed from the reel.

The tension of the strings 6 and 7 will tend to pull the arms 10 and 11 towards the arm 5. In order to maintain the original setting of the arms 10 and 11 and to prevent shifting of the arms 10 and 11 from tearing the chart, it is desirable to provide the pivot 15 with means for locking the angular relationship of the arms 10 and 11. Such means should leave the arm 5 free to swing with respect to the arms 10 and 11. Locking means of the type required may readily be devised and may include a simple wing-nut arrangement for preserving the desired relation of the arms 10 and 11 after such relation has been determined by the location of the base points on the chart. In order to simplify the drawings, the representation of such wing-nut arrangement has been omitted on Fig. 1.

The instrument shown in Fig. 1 may be operated with the following simple procedure. With the reels sufficiently paid out (or the tension adjustment, if there is one, on the slider 25 sufficiently relaxed) to permit convenient adjustment of the angular relationship of the arms 10 and 11, the position of the sliders 12 and 13 and the angular relationship of the arms 10 and 11 are so set that the base points of the device coincide with the respective locations of the radio stations in question as indicated on a suitable chart. These adjustments are then fixed by means of the respective set screws and the like and the knobs 17 and 18 are adjusted in accordance with information provided by the radio equipment when such equipment is receiving signals from the said three stations. The knob 17 will be adjusted in accordance with the time displacement between signals of one pair of stations, referred to a common time standard, and the knob 18 will be set at a similar adjustment relating to the reception of signals from the other pair of stations, the station common to both pairs of stations being that one the location of which corresponds to the position of the pivot 15 on the chart. When the reels have been thus adjusted by means of the knobs 17 and 18, the slider 25 is then moved toward the pivot 15 until the strings are tight. If a tension adjustment is provided on the instrument, this is brought up to the desired standard tension, as above described. Making sure that the base points of the instrument are properly located on the chart, a mark is then made on the chart with or through the position marker 27.

The position of the radio receiver will thus be indicated without going through the steps of drawing any hyperbolae. The rod 5 being free to swing during the adjustment mentioned will automatically assume the desired angular position. If it is desired to indicate on the chart the relative accuracy of the "fix" in various directions, it may be useful to mark small portions of the hyperbolic arcs the intersection of which determines the "fix." This may be simply accomplished after the position has been plotted by first keeping the knob 17 fixed and releasing the knob 18 and then causing a small arc to be drawn by swinging the arm 5 slightly back and forth while the slider 25 makes a corresponding adjustment of its position and afterwards returning the knob 18 to the setting corresponding to the "fix," releasing the knob 17 and causing another small portion of a hyperbolic arc to be drawn through the indicated position. If the two arcs so drawn intersect almost at right angles, the determination of the position may be expected to have the same approximate accuracy in all directions.

It will not be necessary in general practice to go through any such procedure to estimate the accuracy of the "fix" referred to different directions, because this can be estimated by inspection from the relative position of the base points and of the plotted position of the radio receiver.

It will be seen that the reels controlled by the knobs 17 and 18 should be sufficiently restrained to prevent their moving when the slider 25 is pulled by the spring 28 or by some tension adjusting device in order to tighten the strings 6 and 7. Construction of reel mechanism for such operation will be apparent to those skilled in the art. The reels may simply be provided with suitable friction disks or the like, or a locking arrangement of some well known form may be provided for locking the position of the reels after the knobs 17 and 18 have been set.

A portion of a modified form of instrument in accordance with the present invention is illustrated in Figs. 2 and 3, Fig. 2 being a plan view of the portion of the apparatus near the outer end of the arm 5 and Fig. 3 being a transverse cross-section of the slider and position marker mounted on the arm 5. In Fig. 2 the reels (again not shown) are again mounted coaxially but their common axis is in this case horizontal instead of vertical. The reel mechanisms are mounted in a tubular housing 30 which is in turn mounted on the flanges 31 and 32 of the rod 5. If the rod 5 is made of well known organic "plastic" materials, these flanges 31 and 32 may be molded integrally with the rod 5. Otherwise they may be provided fastened to the rod 5 by suitable brackets. A flat sheet 33 of thick Celluloid or other plastic material, having flanges 34, 35, 36 and 37 engaging the flanges 31 and 32 is adapted to provide a smooth surface permitting this end of the instrument to slide smoothly over the surface of the chart and at the same time elevating the rod 5 sufficiently from the chart that the bottom of the slider 38 may ride smoothly over the surface of the chart without undue pressure. One of the reels is controlled by the knob 40 while the other is controlled by the knob 41. Drum-type scales 42 and 43 may be associated with the knobs 40 and 41 respectively to indicate the amount of spring which has been payed out. These may be calibrated, if desired, in terms of the information to be supplied by the radio equipment, as related to a standard-scale chart. If a single revolution of the reel is sufficient to cover the desired range of operation of the instrument, no further indicating instrument is necessary. Otherwise, gearing may be provided between the knobs and the respective scales, or a counting mechanism may be added to indicate the number of revolutions of the reel, referred to some standard string length.

The construction of the slider and position marker will be best understood from Fig. 3. The body of the slider 38 is simply in the form of a collar, which may be made from some convenient synthetic resin or "plastic" and is adapted to slide freely in the longitudinal direction on the arm 5. A tubular member 45 is centrally mounted on the collar 38 and passes through the central slot of the arm 5. Vertically slidable in the tubular member 45 is the position marker which is a composite structure including the cylindrical plug 46, the cylindrical plug 47, two thin rods 48 and 49 and a marker point or pencil 50. The marker point 50 engages in a guide tube 51 mounted in the lower end of the tubular structure 45. A spring 52 is provided to keep the marker point 50 lifted off the chart until the plug 46 is manually depressed.

The rods 48 and 49 act as guide rods for the strings 6 and 7, determining the points of inflection of these strings. Both strings are threaded through the hole 53 in the tubular structure 45 and then between the rods 48 and 49, one of the strings then proceeding through the lateral aperture 54 and the other diverging in the other direction and proceeding through the lateral aperture 55. If desired, the plug 46 and/or the plug 45 may be keyed in the cylindrical structure 45 in order to maintain the lateral alignment of the guide rods 48 and 49, but in general the divergence and tension of the strings will be sufficient to keep such lateral alignment within the permissible range of variation.

Fig. 4 illustrates a modified type of plotting instrument in accordance with this invention which employs two swinging arms instead of a single swinging arm. Although the swinging structure is slightly more complicated, this arrangement permits dispensing with the arms 10 and 11, if desired. In Fig. 4 the instrument shown is provided with two swinging arms 60 and 61 both of which are provided with a long central slot. These swinging arms are pivoted by suitable means at two of the base points on the chart, preferably the two base points having the widest separation. The strings 62 and 63 have their free ends fixed to a suitable terminal which is adapted to be fastened at the third base point as shown at 64. If desired, the base point may be connected by additional rods as shown in dotted lines, but it may be convenient to omit such rods. The string 62 connects to a reel 66 mounted on the free end of the rod 60 and the string 63 connects to a reel 67 mounted on the free end of the rod 61. A position locating slider indicated diagrammatically at 68 is mounted in such a way that it passes through the central slot of both the rods 60 and 61, thus permitting both rods to swing about their respective base points. The slider 68 may be made of a cylindrical structure passing through the slot of the swinging arms and having suitable flanges engaging the flat surfaces of these arms. The slider 68 carries suitable guides corresponding in function to the guide rods 48 and 49 on Fig. 3 or to the locator post 27 in Fig. 1. Adjustment of the reels 66 and 67 will cause the swinging arms and the slider 68 to adjust themselves in their relative positions so that the slider 68 will indicate the desired fix. A spring or other tightening device (not shown) is preferably provided to draw the slider 68 in the general direction of the base point 64.

If desired, the reels 66 and 67 may be mounted at the base point 64 instead of on the swinging arms. If so located the reels may be coaxially mounted for convenience of construction.

It will be seen that various mechanical arrangements and modifications of the same may be employed for the position-finding slider, for the reels and their associated mechanism, for the indicating scales and for the various other portions of instruments of this invention without departing from the essence of the present invention.

What is claimed is:

1. Apparatus for plotting on a chart the intersection of two hyperbolic arcs having a common focus comprising, pivot points located at the other two foci of said hyperbolic arcs, first and second swinging arms respectively pivoted at one end on said pivot points, first and second strands each attached at one end to said chart at said common focus, the other end of said first strand being attached to the unpivoted end of said first swinging arm and the other end of said second strand being attached to the unpivoted end of said second swinging arm, means secured to the unpivoted ends of said arms for independently adjusting the length of said strands, a guide for both of said strands being slidably mounted on both said swinging arms, said guide being adapted to provide substantially coincident points of inflection for each of said strands, and means associated with said guide for indicating on said chart a position determined by the position of said guide.

2. Apparatus for plotting on a chart the intersection of two hyperbolic arcs having a common focus comprising, pivot points positioned over the other two foci of said hyperbolic arcs, first and second swinging arms respectively pivoted at one end on said pivot points, first and second strands each attached at one end to said chart at said common focus, the other end of said first strand being attached to the unpivoted end of said first swinging arm and the other end of said second strand being attached to the unpivoted end of said second swinging arm, reel mechanisms mounted near the unpivoted ends of each of said swinging arms for independently adjusting the length of said strands, a sliding guide for both of said strands adapted to provide substantially coincident points of inflection for each of said strands and slidably mounted on both of said swinging arms, and means associated with said guide for indicating on said chart a position determined by said points of inflection.

3. Apparatus for plotting the intersection of two hyperbolic arcs having one common focus, which apparatus includes a pivot point located at said common focus, a swinging member pivotally mounted at one end on said pivot point, a guide including strand engaging means slidably mounted for movement along said swinging member, two strands, means for respectively anchoring said strands at one end at the other two foci of said hyperbolic arcs, said strands passing over said strand engaging means to the unpivoted end of said swinging member, means secured at the unpivoted end of said swinging member for independently adjusting the length of said strands, means secured to said guide for normally urging said guide toward said pivot point and a marking device arranged for projection through said guide.

4. Apparatus for plotting the intersection of two hyperbolic arcs having one common focus, which apparatus includes a pivot point located at said common focus, a swinging member pivotally mounted at one end on said pivot point, a guide including strand engaging means slidably mounted for movement along said swinging member, two strands, means for respectively anchoring said strands at one end at the other two foci of said hyperbolic arcs, said strands passing over said strand engaging means to the unpivoted end of said swinging member, said strand engaging means providing substantially coincident points of inflection for each of said strands, means secured to the unpivoted end of said swinging member for independently adjusting the length of said strands and securing said strands to said unpivoted end, and means associated with said guide for indicating the location determined by the position of said points of inflection.

5. Apparatus for plotting the intersection of two hyperbolic arcs having one common focus, which apparatus includes a pivot point located at said common focus, a swinging member having a longitudinal slot therein pivotally mounted at one end on said pivot point, a guide including string engaging means slidably mounted for movement along said swinging member, two strings, means for respectively anchoring said strings at one end thereof at the other two foci of said hyperbolic arcs, said strings passing over said string engaging means of said guide to the unpivoted end of said swinging member, a pair of reels mounted on the unpivoted end of said swinging member for independently adjusting the length of said strings and securing said strings to said unpivoted end of said member, an elastic member connected between said guide and said pivot point for normally urging said guide toward said pivot point thereby to maintain said strings taut, and means associated with said guide and passing through said slot in said member for indicating the location determined by the point at which said strings pass over said string engaging means.

6. Apparatus for plotting the intersection of two hyperbolic arcs having one common focus, which apparatus includes a pivot point located at said common focus, a swinging member pivotally mounted at one end on said pivot point, a guide including string engaging means slidably mounted for movement along said swinging member, two strings, means including a pair of arms pivoted at one end coaxially with said pivot point for respectively anchoring said strings at one end thereof at the other two foci of said hyperbolic arcs, said strings passing over said string engaging means of said guide to the unpivoted end of said swinging member, means secured at the unpivoted end of said swinging member for independently adjusting the length of said strings, elastic means secured to said guide for normally urging said guide toward said pivot point and means adapted for projection from said guide for indicating the location determined by the position of said guide.

7. Apparatus for plotting the intersection of two hyperbolic arcs having one common focus, which apparatus includes a pivot point located at said common focus, a swinging member pivotally mounted at one end on said pivot point, a guide including strand engaging means slidably mounted for movement along said swinging member, two strands, a pair of arms pivoted at one end coaxially with said pivot point, each of said arms having an adjustable slider mounted thereon to which one end of said strands are respectively attached, the pivotal mounting of said arms and the adjustable mounting of said sliders coacting to position the sliders at the other two foci of said hyperbolic arcs, said strands passing over the strand engaging means of said guide to the unpivoted end of said swinging member, means secured at the unpivoted end of said swinging member for independently adjusting the length of said strands, means secured at said pivot point normally urging said guide toward said pivot point and a marking device adapted for projection from said guide.

8. Apparatus for plotting the intersection of two hyperbolic arcs having one common focus, which apparatus includes a pivot point located at said common focus, a swinging member pivotally mounted at one end on said pivot point, a guide including strand engaging means slidably mounted for movement along said swinging member, two strands, a pair of arms pivoted at one end coaxially with said pivot point, each of said arms having an adjustable slider mounted thereon to which one end of said strands are respectively attached, the pivotal mounting of said arms and the adjustable mounting of said sliders coacting to position said sliders at the other two foci of said hyperbolic arcs, said strands passing over said strand engaging means of said guide to the unpivoted end of said swinging member, said strand engaging means providing substantially coincident points of inflection for each of said strands, a pair of reels secured at the unpivoted end of said swinging member for independently adjusting the length of said strands, means secured at said pivot point normally urging said guide toward said pivot point, and marking means associated with said guide for indicating the location determined by the position of said points of inflection.

9. Apparatus for plotting the intersection of hyperbolic arcs, which apparatus includes a pivot point located at a base point on a chart, a swinging member pivotally mounted at one end on said pivot point, two strands, means for anchoring an end of at least one of said strands at another base point on said chart, means secured to the unpivoted end of said swinging member for securing the other end of said one strand to the unpivoted end of said swinging member and for adjusting the length of said one strand, a guide slidably mounted on said member for movement therealong, said guide having means for engaging both of said strands and providing substantially coincident points of inflection for each of said strands, and means associated with said guide for indicating on said chart the location determined by the position of said point of inflection.

10. Apparatus for plotting the intersection of hyperbolic arcs having a common focus, which apparatus includes a pivot point located at one focus of one of said arcs, a swinging member pivotally mounted at one end on said pivot point, two strands, means for anchoring an end of at least one of said strands at the other focus of said one arc, means secured to the unpivoted end of said swinging member for securing the other end of said one strand to the unpivoted end of said swinging member and for adjusting the length of said one strand, a guide slidably mounted on said member for movement therealong, said guide having means for engaging both of said strands and providing substantially coincident points of inflection for each of said strands, and a marking device adapted for projection from said guide for indicating the location determined by the position of said points of inflection.

S. A. GOUDSMIT.

REFERENCES CITED

The following references are of record in the file of this patent:

UNITED STATES PATENTS

| Number | Name | Date |
|---|---|---|
| 2,385,827 | McKaba | Oct. 2, 1945 |
| 2,422,025 | Luck | June 10, 1947 |
| 2,493,786 | Swift | Jan. 10, 1950 |

FOREIGN PATENTS

| Number | Country | Date |
|---|---|---|
| 640,276 | Germany | Dec. 28, 1936 |